(12) United States Patent
Jefferson

(10) Patent No.: US 6,637,625 B1
(45) Date of Patent: Oct. 28, 2003

(54) CONTINUOUS POSITIVE DISPLACEMENT METERING VALVE

(75) Inventor: Richard Jefferson, Garden Grove, CA (US)

(73) Assignee: Delaware Capital Formation, Wilmington, DE (US)

( * ) Notice: Subject to any disclaimer, the term of this patent is extended or adjusted under 35 U.S.C. 154(b) by 0 days.

(21) Appl. No.: 09/838,674

(22) Filed: Apr. 19, 2001

Related U.S. Application Data

(60) Provisional application No. 60/198,594, filed on Apr. 19, 2000.

(51) Int. Cl.[7] .................................................. G01F 11/00
(52) U.S. Cl. ...................... 222/275; 222/380; 222/333; 222/255; 417/419
(58) Field of Search ............................... 222/333, 380, 222/275, 278, 252, 255; 417/531, 532, 539, 415, 419

(56) References Cited

U.S. PATENT DOCUMENTS

| | | | | |
|---|---|---|---|---|
| 3,580,696 A | * | 5/1971 | Schwing | 417/532 |
| 3,647,325 A | * | 3/1972 | Johnson | 417/531 |
| 3,704,080 A | * | 11/1972 | Cross | 417/531 |
| 3,838,948 A | * | 10/1974 | McCorvey | 417/362 |
| 4,067,666 A | * | 1/1978 | Richards | 417/532 |
| 4,880,365 A | * | 11/1989 | Austin | 417/531 |
| 5,141,414 A | * | 8/1992 | Pierce et al. | 417/532 |
| 5,865,606 A | * | 2/1999 | Huang | 417/532 |
| 5,931,355 A | | 8/1999 | Jefferson | |
| 5,993,181 A | * | 11/1999 | Hudelmaier | 417/532 |
| 6,264,442 B1 | * | 7/2001 | Foss | 417/531 |
| 6,368,080 B1 | * | 4/2002 | Sipin | 417/415 |

* cited by examiner

Primary Examiner—Kevin Shaver
Assistant Examiner—Stephanie Willatt
(74) Attorney, Agent, or Firm—Knobbe, Martens, Olson & Bear, LLP.

(57) ABSTRACT

A continuous operation metering valve, based on true volumetric positive displacement technology, uses an innovative dual rack and drive pinion design that enables the valve to dispense from one meter chamber while the other meter chamber is filling. This provides greater dispense cycle rates because it does not require a fill or reload period. With an optional encoder-controlled motor, the inventive metering valve is capable of almost unlimited precision dispensing with "on-the-fly" adjustment capability. The metering valve is easily disassembled and cleaned, using stainless steel wetted path components and Teflon seals for the widest range of chemical compatibility. An integral electronic board, mounted to the side of the valve, may be utilized to control the 4-way directional valve and motor direction (when not using a rotary encoder control).

10 Claims, 4 Drawing Sheets

CONTINUOUS POSITIVE DISPLACEMENT METERING VALVE

This application claims the benefit under 35 U.S.C. 119(e) of the filing date of Provisional Application Ser. No. 60/198,594, filed on Apr. 19, 2000, which application is expressly incorporated herein by reference.

BACKGROUND OF THE INVENTION

This invention relates to continuous positive displacement metering valves, and more particularly to an improved linear metering valve having an innovative dual rack and pinion design that enables a valve to dispense from one meter chamber while another meter chamber is filling.

Microvalves are known in the prior art for dispensing fluid materials such as adhesives, epoxies, potting compounds, SMT adhesives, two part adhesives, and solder pastes (with solids dispersed therein), and the like, in a repeatable and accurate manner. Typically, these dispensers for fluid material are usd in a wide variety of industries, such as electronic assembly and repair, form in place gasketing, component assembly and sealing, mold making, casting, tool and machine and equipment fabrication and assembly, SMT repair, and a variety of other uses.

Existing positive displacement dispensing systems of this type are of a rotary construction such as the valve disclosed in U.S. Pat. No. 5,931,355, herein expressly incorporated by reference, commonly assigned with the present application. This prior art valve illustrates a microvalve dispenser assembly which includes a gear motor having a housing mounted thereon. Also shown are accessories such as a spring clamp 16 and bracket 17, both supported by the motor for mounting the valve assembly on various equipment for motion in an X-Y-Z direction, for example. The gear motor may be any one of either a direct current servo or stepper type and of a suitable wattage to provide motor RPM rates of 1–500 rpm. The motor may be controlled by a controller mechanism, well known in the art, for example, a Model TS5100 from Techcon Systems, Inc.

The microvalve dispenser may be used to dispense accurately any one of the materials previously mentioned as dots down to 0.010 of an inch in diameter or smaller at rates of 5 or more per second. Alternatively, continuous beads of 0.010 of an inch to 0.050 of an inch or larger and at rates of 4 inches per second may be dispensed. The dispensed fluid may have a viscosity of as low as 30K cps to as high as 1 million cps. It may also be used for products with 90% metal and 10% binder in the flux.

The motor includes an output shaft for driving a helical screw or auger supported for rotation in the insert. Fluid in a measure amount, depending on the rotational speed and configuration of the screw is urged out of an outlet which forms the exit passageway of the insert. Mounted on the output of the outlet is a tubular dispenser tip device, essentially in the form of a needle but without a point. The dispenser may dispense a bead of a given dimension or a dot, again of a given dimension. The dimension of the bead or dot may vary based on the internal diameter of the dispenser tip and other well known factors such as pressure and feed rate of the fluid, for example.

Thus, they are not based on true volumetric positive displacement technology. It would be advantageous for at least some dispensing applications to utilize metering valves based on true volumetric positive displacement technology, which enable the valve to dispense from a first meter chamber while the second meter chamber is filling, and vice-versa. The result would be continuous operating cycle, with greater dispense cycle rates because of the lack of need for a fill or reload period.

SUMMARY OF THE INVENTION

The present invention comprises continuous operation metering valve based on true volumetric positive displacement technology. Unlike conventional metering valves, the inventive valve uses an innovative dual rack and drive pinion design that enables the valve to dispense from one meter chamber while the other meter chamber is filling. This provides greater dispense cycle rates because it does not require a fill or reload period. With an optional encoder-controlled motor, the inventive metering valve is capable of almost unlimited precision dispensing with "on-the-fly" adjustment capability. The metering valve is easily disassembled and cleaned, using stainless steel wetted path components and Teflon seals for the widest range of chemical compatibility. An integral electronic board, mounted to the side of the valve, may be utilized to control the unique 4-way directional valve and motor direction (when not using a rotary encoder control).

The invention, together with additional features and advantages thereof, may best be understood by reference to the following description taken in conjunction with the accompanying illustrative drawing.

DESCRIPTION OF THE PREFERRED EMBODIMENT

Figure 1:
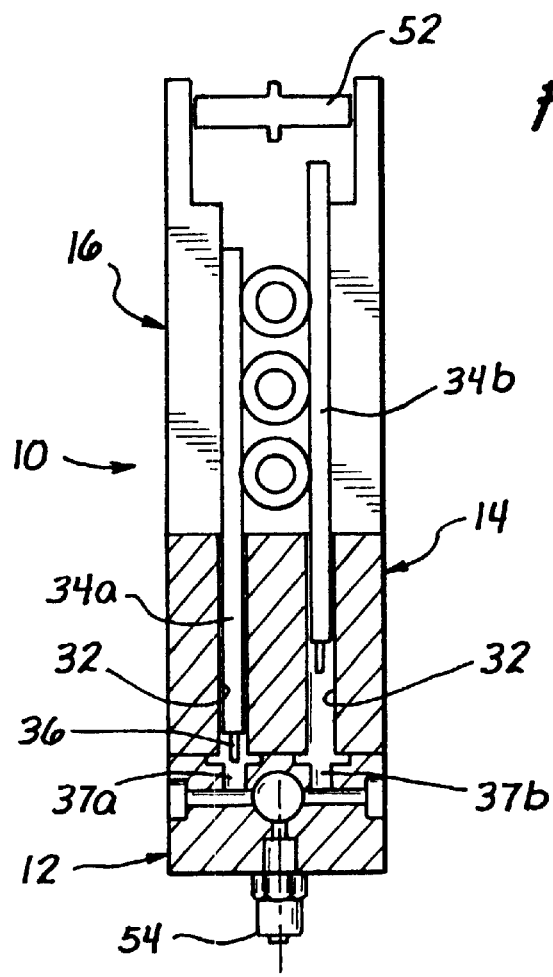
FIG. 1 is a cross-sectional frontal view of a metering valve constructed in accordance with the principles of the present invention.
Figure 2:
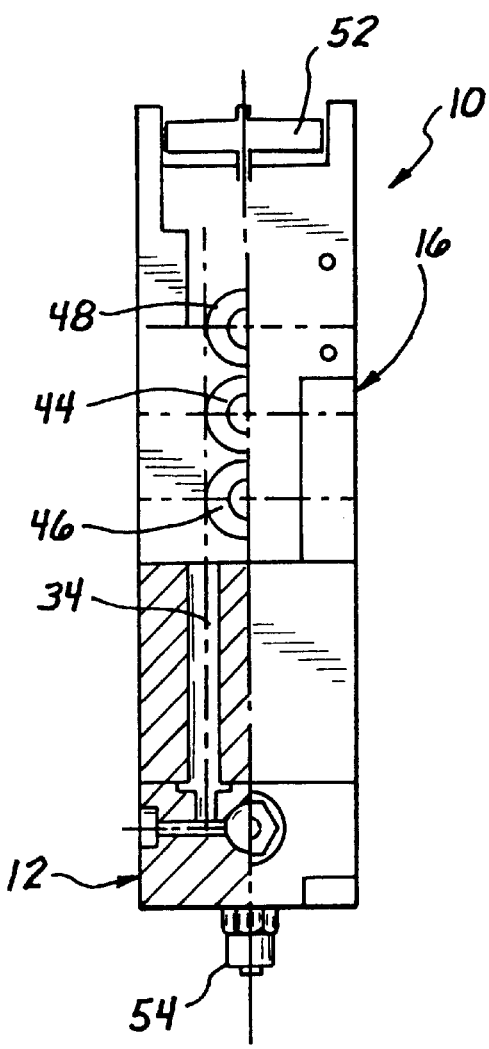
FIG. 2 is a partial cross-sectional view similar to FIG. 1.
Figure 3:
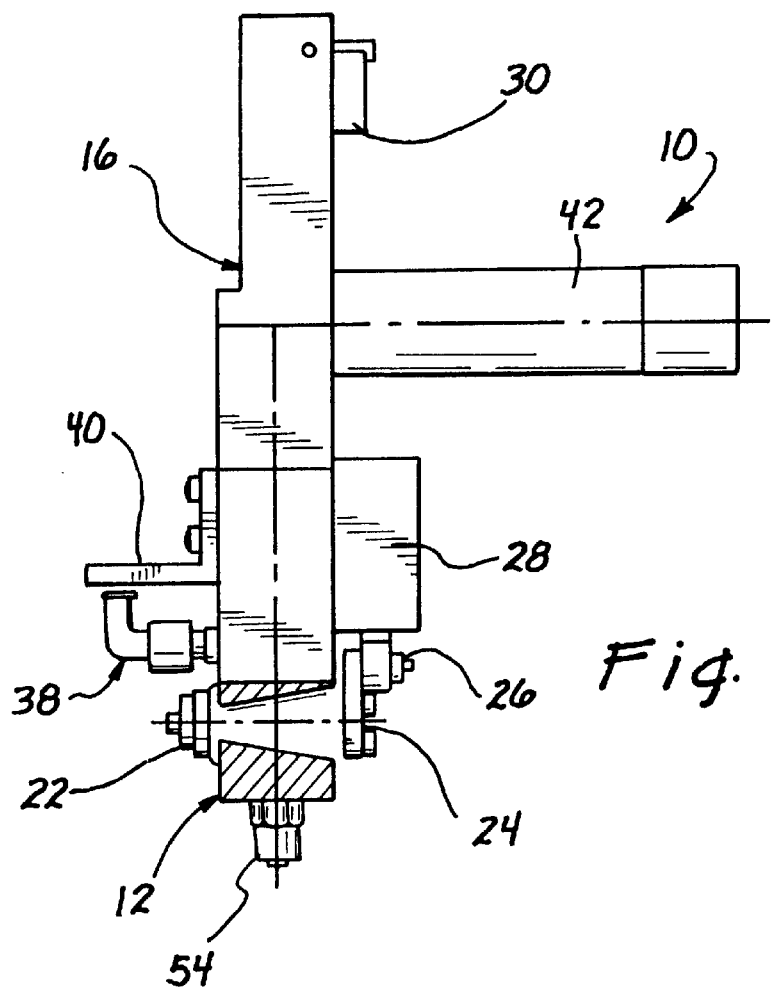
FIG. 3 is a partial cross-sectional side view of the metering valve illustrated in FIGS. 1 and 2.

Referring now more particularly to the drawings, there is shown in FIGS. 1–3 a continuous metering valve 10 constructed in accordance with the principles of the present invention. The valve 10 is advantageously constructed in a modular fashion, to include a valve block 12, a meter block 14, and a motor block 16. The valve block may be constructed of stainless steel or other suitable material, and comprises in a preferred embodiment a tapered bore 18 for receiving therein a tapered directional valve 20. The valve 20 preferably comprises a 4-way tapered seat valve, of a known construction, and is secured within the bore 18 using a nut and washer assembly 22 (FIG. 3). However, alternatively, for example, a 4-way cylindrical seat valve and corresponding cylindrical bore could be utilized, and the employment of other known directional valve configurations is within the scope of the invention as well.

The directional valve 20 is actuated, in the illustrated embodiment, using a pivot arm 24 (FIG. 3), which in turn is responsive to a pivot plate 26. An air cylinder 28 may be utilized to drive the pivot plate 26, responsive to the actuation of a solenoid valve (not shown), driven in turn by commands from a control circuit/switch 30, or other suitable means.

The meter block 14 may be constructed, as well, of stainless steel or other suitable material. A pair of bores 32 in the meter block 14 are adapted to accommodate corresponding ones of a pair of meter rods 34. The meter rods 34 each include a respective meter tip 36, which is particularly adapted to apply displacement pressure against fluid contained in the bore 32 and metering chamber 37 corresponding thereto. Such fluid is a fluid to be dispensed, as discussed supra in the background portion of this application, and may include, for example, adhesives, epoxies, potting compounds, SMT adhesives, two part adhesives, and solder pastes (with solids dispersed therein), and the like, or any other desired fluid. The fluid is introduced into the valve 10 via a fluid inlet port 38 which preferably comprises a female Luer Lock or 10-32 inlet. A syringe mount bracket 40 may be employed, to accommodate industrial syringes containing the fluid to be dispensed, and to be introduced into the valve through the inlet port 38. Typically, such syringes have a fluid capacity of up to 35 cc.

With reference now to the motor block 16, this housing element may be constructed of tool steel, for example, plated with a hard chrome finish to provide improved wear resistance. To the motor block 16 is attached a motor 42, which may comprise a 6 watt, 24 VDC gear motor, in one preferred embodiment. The motor drives a drive gear 44 in the motor housing 16, which housing also contains a spur/idler gear 46 and a thrust washer 48.

Figure 4:
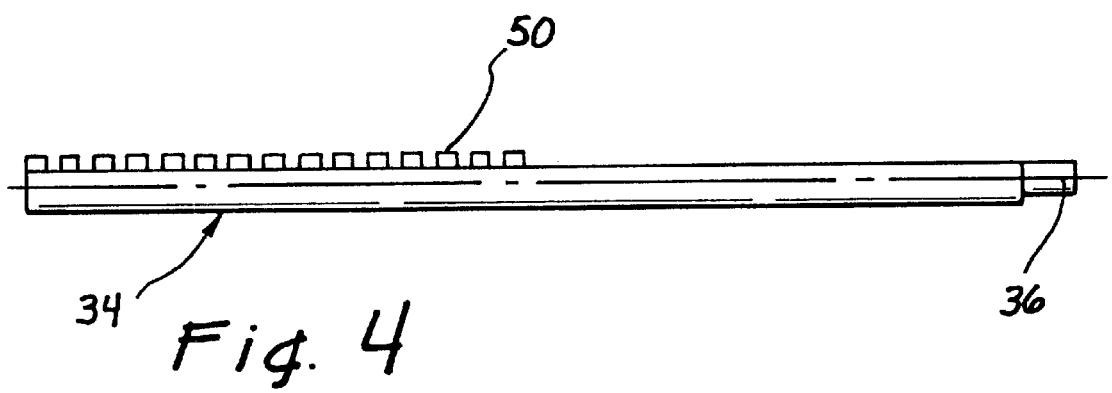
FIG. 4 is a plan view, in isolation, of a meter rod which forms a part of the present invention.
Figure 5:
FIG. 5 is an end view of the meter rod shown in FIG. 4.
Figure 6:
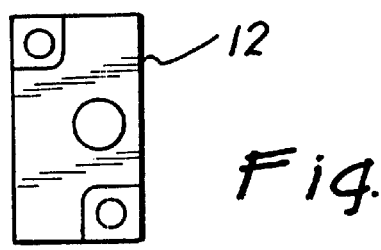
FIG. 6 is a back view of a valve block which forms a part of the present invention.
Figure 7:
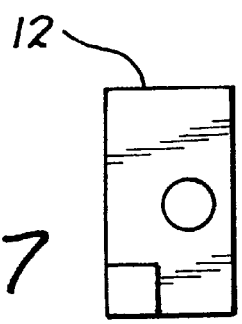
FIG. 7 is a side view of the valve block illustrated in FIG. 6.
Figure 8:
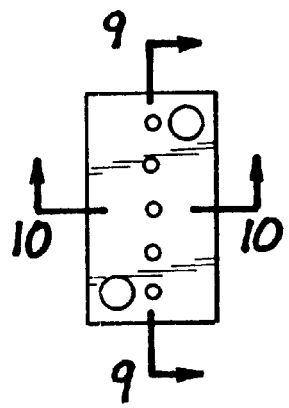
FIG. 8 is an front view of the metering block shown in FIGS. 6 and 7.
Figure 9:
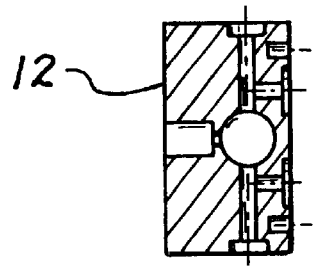
FIG. 9 is a cross-sectional view of the valve block illustrated in FIGS. 6–8, taken along lines 9—9 of FIG. 8.
Figure 10:
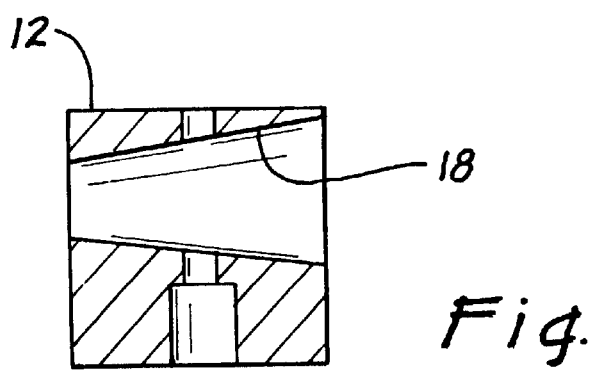
FIG. 10 is a cross-sectional view of the valve block illustrated in FIGS. 6–9, taken along lines 10—10 of FIG. 8.
Figure 11:
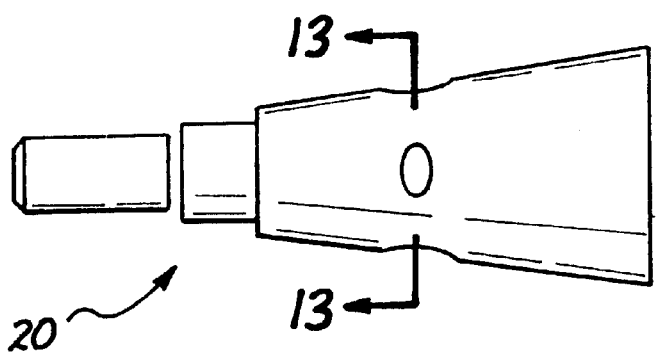
FIG. 11 is a schematic plan view of a directional valve which forms a part of the present invention.
Figure 12:
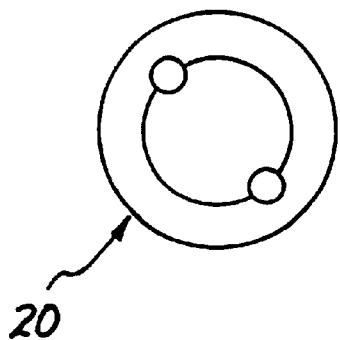
FIG. 12 is an end view of the directional valve shown in FIG. 11.
Figure 13:
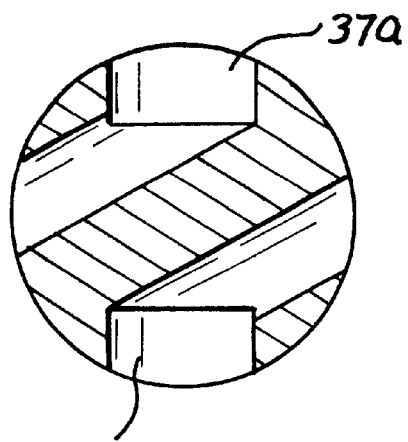
FIG. 13 is a cross-sectional view taken along lines 13—13 of FIG. 11.

The upper ends of the meter rods 34, better seen in FIG. 4, are configured as racks in a rack and pinion system. In other words, the outer perimeters of the meter rods 34 in this region comprise gear teeth 50 which are adapted to engage corresponding teeth on the outer perimeter of the drive gear 44, so that, as in a rack and pinion system, rotation of the drive gear 44 by the motor 42 causes linear actuation of the meter rods 34 in both an upward and a downward direction. Advantageously, rotation of the motor in a first direction will cause the respective meter rods 34a and 34b to move linearly in opposing directions, with one moving upwardly and the other downwardly. Then, when an upper end of the upwardly moving meter rod 34a, 34b contacts a switch plate 52 disposed at an upper end of the motor block 16, a limit switch is actuated, which in turn reverses the direction of the motor 42. Now, the meter rod 34a, which was moving upwardly, moves downwardly, and the meter rod 34b moves upwardly.

In operation, a controlled signal to the drive motor 42 rotates the drive gear 44, which in turn pushes one of the two racks or meter rods 34 in the dispense direction (downwardly) and the other rack or meter rod 34 in the fill direction (upwardly). The meter rods 34 are assembled with cup seals to provide a chemically compatible, positive fluid seal. This linear rack movement results in positive volumetric fluid displacement. Low voltage signals to the motor result in a low dispense rate. Small voltage signals result in small shot sizes.

Each side of the dual meter chamber valve preferably holds 1 cc of fluid volume, although smaller or larger capacity metering valves may be appropriate for certain applications. When one metering chamber 37 and bore 34 empties, the limit switch on the switch plate 52 reverses the motor polarity and begins dispensing from the opposing metering chamber. Simultaneously with the reverse in motor polarity, the valve 20 is actuated to an alternate position, so that the other metering chamber is established in fluid contact with a fluid outlet 54, which preferably comprises a male Luer Lock.

A rotary encoder on the motor 42 can provide a closed loop signal that rotates the motor in controlled discrete angular movements that result in precise linear displacement.

A particular advantage of the present invention is the ability to easily disassemble the system components for easy maintenance and cleaning. Only three screws need be removed to complete the disassembly. Once disassembled, the bores may simply be brushed out to clean them.

As with most dispensing valves of this type, small amounts of material typically appear as drops on the end of the dispense tip and need to be applied or "dabbed" to the working surface. Z motion (Up and Down) is required for this operation. The Z head moves the dispense tip down to the working surface within a predetermined distance (gap height) from the surface. The material adheres to the working surface at that point of contact and the Z head moves away, depositing the drop. This is repeated with each subsequent drop of material. Accuracy is measured as the repeatability of each drop volume. Each drop can be as small as 0.0008 ml.

Larger amounts of material can be dispensed as beads or potting. The Z head will move to the working surface at the fixed gap height and begin to deposit the material. Motor voltage variation and signal length control dispense rate and amount.

In alternative embodiments, a disposable path version of the inventive metering valve may be employed, wherein the meter block and valve block assemblies may be provided in low cost injection molded plastic for applications where two part materials may set up or where clean up is not safe, as with hazardous materials, or not cost effective. A stepper motor could be utilized, if desired. Additionally, a microshot version can be utilized, using a specialized coupling design, where smaller meter rod tips are attached to the standard meter racks.

Accordingly, although an exemplary embodiment of the invention has been shown and described, many changes, modifications, and substitutions may be made by one having ordinary skill in the art without departing from the spirit and scope of the invention.

What is claimed is:

1. A positive displacement piston pump for dispensing an adhesive onto a work surface, comprising:
   a metering block defining first and second cylinders;
   a valve block coupled to said metering block and defining a first metering chamber portion and a second metering chamber portion, said first metering chamber portion communicating with and having a smaller cross-section than said first cylinder and said second metering chamber portion communicating with and having a smaller cross-section than said second cylinder;

first and second pistons disposed within said cylinders for reciprocation therein, said first piston having a first metering tip at one end and a first rack toward an opposing end, and wherein said first tip is configured to substantially conform to the geometry of said first metering chamber portion and said second piston having a second metering tip at one end and a second rack toward an opposing end, and wherein said second tip is configured to substantially conform to the geometry of said second metering chamber portion;

a motor in meshing engagement with said first rack and said second rack, such that angular displacement of said motor causes a linear displacement of said first and second pistons in simultaneous opposing dispensing and reloading directions;

a motor controller configured to precisely control the angular displacement of said motor; and wherein the pump is configured to dispense adhesive through a fluid outlet onto a work piece moving relative thereto.

2. The positive displacement piston pump of claim 1, further comprising a source of adhesive, wherein said adhesive is selected from the group consisting of adhesives, epoxies, potting compounds, SMT adhesives, two-part adhesives, or solder pastes.

3. The positive displacement piston pump of claim 1, further comprising a directional valve for selectively allowing communication between the first and second metering chamber portions and said fluid outlet.

4. The positive displacement piston pump of claim 3, further comprising fastening hardware for removably securing said meter block, motor block, and valve block to one another, such that said meter block, motor block, and valve block are readily separable from one another by manipulating said fastening hardware for the purpose of cleaning said first and second metering chamber portions and said directional valve.

5. The positive displacement piston pump of claim 4, wherein said fastening hardware comprises screws.

6. The positive displacement piston pump of claim 1, wherein said valve block is formed from either stainless steel or plastic.

7. The positive displacement piston pump of claim 1, wherein said meter block is formed from either stainless steel, plastic, or tool steel.

8. The positive displacement piston pump of claim 1, further comprising gears disposed within said motor block for engaging said racks on each of said first and second pistons and further engaging said motor.

9. The positive displacement piston pump of claim 1, wherein said motor controller is configured to accurately control said motor to result in desired dispensing volumes.

10. The positive displacement piston pump of claim 1, wherein said motor controller is configured to accurately control said motor to result in a desired dispensing flow rate.

* * * * *